United States Patent [19]

Farr

[11] Patent Number: 4,715,666
[45] Date of Patent: Dec. 29, 1987

[54] HYDRAULIC ANTI-SKID BRAKING SYSTEMS FOR VEHICLES

[75] Inventor: Glyn P. R. Farr, Warwickshire, England

[73] Assignee: Lucas Industries public limited Company, Great Britain

[21] Appl. No.: 863,137

[22] Filed: May 14, 1986

[30] Foreign Application Priority Data

May 18, 1985 [GB] United Kingdom ............... 8512610

[51] Int. Cl.$^4$ ............................................. B60T 8/40
[52] U.S. Cl. ..................................... 303/116; 303/117
[58] Field of Search ............... 188/181 A; 303/11, 61, 303/113, 115, 116, 117

[56] References Cited

U.S. PATENT DOCUMENTS 4,428,624 1/1984 Farr ..................................... 303/116
4,474,413 10/1984 Farr ..................................... 303/116

Primary Examiner—Duane A. Reger
Attorney, Agent, or Firm—Laff, Whitesel, Conte & Saret

[57] ABSTRACT

In an anti-skid braking system a modulator for modulating the supply of hydraulic fluid from a master cylinder to a brake incorporates a flow-control regulator valve and an exhaust valve which is responsive to signals from a sensor. When the exhaust valve is closed the regulator valve is in a first position to permit unrestricted direct flow through it and when the exhaust valve is open a variable orifice in the regulator valve provides a restricted flow through it. The exhaust valve and the valve are only connected hydraulically and a conventional inlet valve normally operated directly by the sensor is omitted. The construction is therefore simplified since relative position tolerances are otherwise eliminated.

14 Claims, 4 Drawing Figures

HYDRAULIC ANTI-SKID BRAKING SYSTEMS FOR VEHICLES

This invention relates to hydraulic anti-skid braking systems for vehicles of the kind in which hydraulic operating fluid from a supply, suitably an hydraulic master cylinder, to a brake is modulated by a modulator assembly in accordance with signals from sensing means, and a supply of hydraulic fluid under pressure from a source is provided to control brake reapplication following the emission of a signal, means being operative in response to a signal to isolate the supply from the brake, and relieve the pressure of fluid applied to the brake, and, at the termination of the signal, to control the re-application of the brake at a controlled rate.

In some known anti-skid braking systems of the kind set forth, for example as described in GB-A-2 161 231, the rate of re-application of the brake at the termination of a skid signal is controlled by a flow-control regulator or valve, incorporating a metering spool, and the means responsive to the skid signal is operative when a skid signal is received, to cause an inlet valve member to close on to an inlet valve seating in the metering spool to isolate the supply from the brake and to cause an exhaust valve to open and relieve fluid from the brake to a reservoir. These actions cause the metering spool to move relatively away from the exhaust valve carrying the closed inlet valve with it and into a metering position in which a variable orifice in the regulator valve, and through which fluid continues to be supplied to the brake, is substantially closed. When the exhaust valve closes at the termination of the skid signal, the metering spool moves relatively towards the exhaust valve to increase the area of the variable orifice whereby to increase the rate at which the pressure applied to the brake is increased. This continues until the inlet valve re-opens when the pressure applied to the brake equalises with the brake-applying pressure.

In another anti-skid braking system disclosed in GB-A-2 119 881 the rate of re-application of the brake at the termination of a skid signal is controlled by a flow-control regulator or valve, incorporating a metering spool, which controls the rate of reapplication of support fluid to a de-boost piston which is operative, in response to a skid signal, to close a valve to isolate the supply from the brake and expand the effective volume of a chamber to relieve the pressure of fluid applied to the chamber, and the means responsive to the skid signal controls the sequential operation of an inlet valve disposed between the flow-control regulator or valve and the de-boost piston and comprising an inlet valve member for co-operation with an inlet valve seating and an exhaust valve disposed between the de-boost piston and a reservoir for fluid and comprising an exhaust valve member for co-operation with an exhaust valve seating.

These known constructions, although entirely satisfactory in operation, are complicated by the need accurately to locate the relative positions of the inlet and exhaust valves. In GB-A-2 161 231 it is also necessary to locate them relative to the flow-control regulator valve and, in particular, necessary to locate accurately the relative positions of the valve seatings and the metering spool.

According to our invention, in an hydraulic anti-skid braking system of the kind set forth the modulator assembly incorporates at least one flow-control regulator valve, and at least one exhaust valve, the flow-control regulator valve comprising a metering spool which works in a bore and is movable between a first position in which it is biassed by a spring to provide unrestricted direct communication of hydraulic fluid to a pressure-responsive means and a second position in opposition to the force in the spring and in which direct communication to the pressure-responsive means is cut-off and a variable orifice defined between the spool and the bore provides an indirect restricted communication of hydraulic fluid to the pressure-responsive means through a fixed orifice in the spool, the pressure drop across which determines the said second position, the exhaust valve being responsive to the signals and being movable between a closed position, when no signal is operative and the spool is biassed by the spring into the said first position, and an open position, when a skid signal is operative to establish the said pressure drop whereby to cause the spool to move into the said second position.

The exhaust valve and the flow-control regulator valve are only connected hydraulically and an inlet valve operated directly by the skid sensing means is omitted. The construction is therefore simplified since relative position tolerances are otherwise eliminated.

In one construction the spool is provided at opposite ends of a radial groove with inlet and exhaust lands which are relatively spaced axially, and each of which is adapted to co-operate respectively with an inlet port located in the wall of the bore and connected to an inlet passage, and with an exhaust port located in the wall of the bore and connected to an exhaust passage leading to the exhaust valve, an outlet port leading from the bore is located within the wall of the bore and is in communication with the groove at all times, irrespective of the relative position of the spool in the bore, and a flow-path from the source is provided through the spool to control the rate of brake re-application.

When the spool is in its first position the inlet port is aligned with the groove to provide unrestricted direct communication between the inlet passage and the outlet port, and when the spool is in its second position the inlet land closes the inlet port but restricted communication is provided through the fixed orifice and from the exhaust port which, in turn, is connected to the outlet port through the groove with which the exhaust port is then aligned.

The pressure-responsive means may comprise the brake itself to which brake-applying fluid is supplied directly through the flow-control regulator valve, or the pressure-responsive means may comprise a de-boost piston for controlling communication between the supply and the brake and to which fluid from the source is supplied through the flow-control regulator valve.

Some embodiments of our invention are illustrated in the accompanying drawings in which.

Figure 1:
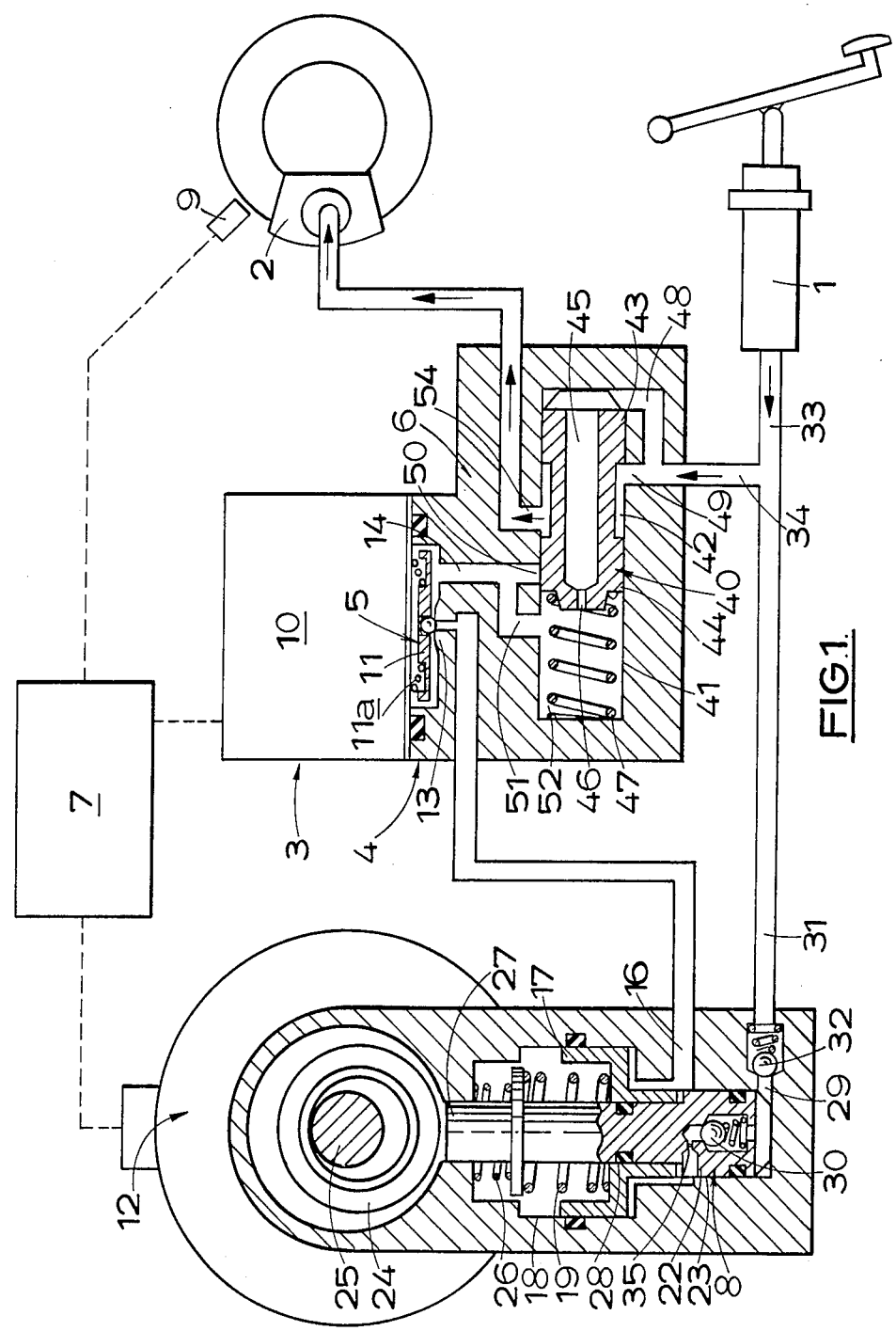
FIG. 1 is a layout of an anit-skid hydraulic braking system in a normal position.
Figure 2:
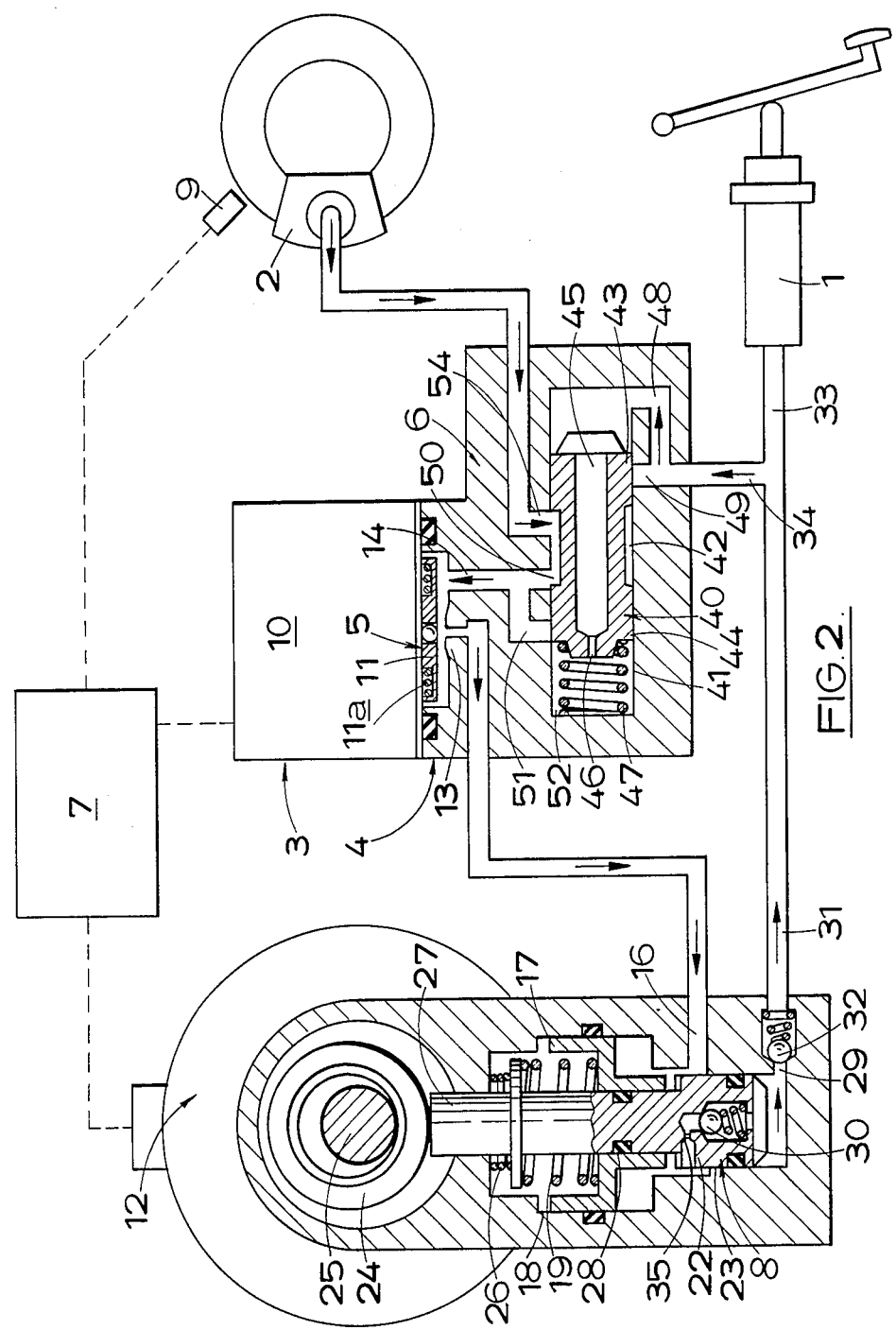
FIG. 2 is a layout similar to FIG. 1 but showing the relative positions of the components when a skid signal is operative.

The anti-skid braking system illustrated in FIGS. 1 and 2 of the drawings comprises a pedal-operated hydraulic master cylinder 1 for operating a wheel brake 2, and a modulator 3.

The modular 3 preferably comprises a housing 4 in which is incorporated a solenoid-operated exhaust valve 5, a flow-control regulator valve 6, a pump 8, and a wheel speed sensor 9 for supplying electrical wheel speed signals to a control module 7. The control module 7 analyses the speed signals to an electrical current to energize the solenoid 10 of the exhaust valve 5 and also, separately, to operate an electric motor 12.

The solenoid-operated exhaust valve 5 comprises an armature incorporating a valve head 11 which is normally urged into engagement with a seating 13 between a passage 14 leading to the regulator valve 6 and an expander chamber 16, by means of a spring 11a. The chamber 16 constitutes a substantially constant, low pressure, reservoir for the pump 8 and is closed at its upper end by an expander piston 17 working in the portion 18 of a bore of stepped outline which is of largest diameter. Normally a caged compression spring 19 urges the expander piston 17 into an advanced position in which the effective volume of the expander chamber 16 is at a minimum.

The pump 8 comprises a plunger 22 which works in the portion 23 of the stepped bore which is of smaller diameter. The plunger 22 is driven in one direction during a power stroke by an eccentric cam 24 on a drive shaft 25 from the electric motor 12, and in the opposite direction, during an induction stroke, by the spring 19. The cam 24 acts on plunger 22 through a push-rod 27 which works through a bore 28 in the expander piston, and in an inoperative position, the push-rod 27 is held out of engagement with the cam 24 by means of a light compression spring 26. During the induction stroke fluid is drawn from the chamber 16 and into a pumping chamber 29 at the outer end of the stepped bore through a restriction 35 and a one-way inlet valve 30, and during the power stroke fluid is discharged from the chamber 29 and into a passage 31 between the master cylinder 1 and the flow control regulator valve 6 through a one-way outlet valve 32.

The passage 31 joins a passage 33 from the master cylinder at a branch 34 which comprises an inlet passage leading to the flow-control regulator valve 6.

The flow-control regulator valve 6 comprises a spool 40 working in a bore 41. The spool 40 is provided at opposite ends of radial groove 42 with axially spaced lands 43 and 44. The spool 40 has a longitudinal bore 45 which terminates at its inner end adjacent to the exhaust valve 5 in a restricted orifice 46. A spring 47 acts on the inner end of the spool 44 normally to urge it into first position in engagement with the opposite, outer, end of the bore 41. In this position the first land 43 is located between a first port 48 and a second inlet port 49 in the wall of the bore 41 and in communication with the branch passage 34, and the second land 44 closes a third port 50 in communication with the passage 14, with a fourth exhaust port 51, also in communication with the passage 14 being open to a chamber 52 at the inner end of the bore 41 in the downstream side of the orifice 46. Irrespective of the position of the spool 40 in the bore 41 the groove 42 is always in free communication with an outlet port 54 connected to the brake 2.

In the inoperative position shown the pump 8 is disabled with the push-rod 27 held out of engagement with the cam 24 by the engagement of the expander piston 17 with the plunger 22. The solenoid 10 is de-energised and the exhaust valve 5 is held in a closed position by the spring acting on the valve head 11. The spool 40 is held against the inner end of the bore 41 to permit free and unrestricted communication between the master cylinder and the brake 2 through the port 49, the groove 42 and the port 54.

When the brake is applied, fluid is supplied from the master cylinder 1 to the brake through the fully open port 49, the groove 42, and the port 54.

When a skid signal is received, the control module 7 is operative to energize the solenoid 10 and the electric motor 12. The solenoid 10 withdraws the armature against the force in its spring, in turn urging the valve head away from the seating 13, to open the exhaust valve 5, and energization of the motor 12 causes the shaft 25 to rotate.

As illustrated in FIG. 2, the chamber 52 is connected to the expander chamber 16 and the consequent pressure drop across the fixed orifice 46 causes the spool 40 to move relatively towards the exhaust valve 5 against the force in the spring 47. Initial movement of the spool 40 in this direction causes the land 43 to close the inlet port 49, with which it defines an inlet valve, to isolate the master cylinder 1 from the brake 2. Further movement of the spool 40 in the same direction causes the land 44 to uncover the third port 50 in turn to place the ports 50 and 54 in communication through the groove 42 with the result that the brake 2 is also connected to the expander chamber 16 to relieve the pressure applied to the brake. Finally the spool 40 moves into a rest position at which the land 44 hovers at the edge of the exhaust port 51, with the outer edge of the land 44 constituting a variable orifice with the port 51.

The pressure returned from the brake 2 to the expander chamber 16 moves the expander piston 17 relatively towards the cam 24 against the force in the spring 19. This enables the push-rod 27 to engage with the cam 24, and the pump 8 is operable to admit fluid at low pressure from the expander chamber 16 through the inlet valve 30 and pump it into the passage 31 through the outlet valve 32 as described above. The reciprocating movement of the plunger 22 is limited by the throw of the cam 24.

While the skid signal is being received by the control module 7, the solenoid-operated valve 5 is held open and the master cylinder 1 continues to supply fluid to the brake 2 by flow from the branch 34 and through the port 48, the bore 45 in the spool 40, the orifice 46 and the communicating ports 51 and 52 with the land hovering at the edge of the exhaust port 51 as described above. The fluid is therefore supplied to the brake 2 at a restricted rate determined by fixed orifice 46 and by the setting of the variable orifice in the flow-control regulating valve 6, namely by the co-operation of the metering edge of the land 44 with the port 51. Flow from the master cylinder 1 to the brake 2 is substantially constant, being determined by the pressure drop across the fixed orifice 46. This pressure drop is proportional to the force in the spring 47 acting upon the area of the spool 44.

The pump 8 is also designed to give a similar constant output even if the predetermined speed of rotation of the motor shaft 25 should vary. This is achieved by providing the restriction 35 on the upstream side of the inlet valve 30 through which fluid is admitted, from the substantially constant, low-pressure reservoir 16, during the induction stroke of the pump 8. Thus the flows from and towards the master cylinder 1 are matched, and the brake pedal is held steady.

At the termination of the skid signal, the solenoid 10 is de-energised and the spring 11a acts to urge the valve head 11 into engagement with the seating 13, thereby closing the exhaust valve 5. The flow-control regulating valve 6 remains in the metering mode with the inlet valve closed so that the pressure applied to the brake 2 increases at a fixed rate. At the same time the pump 8 continues to return fluid to the master cylinder 1 so that the brake pedal is still held in a steady position.

Since the exhaust valve 5 is closed, the output from the pump 8 will eventually reduce as fluid admitted from the reservoir 16 is no longer replenished from the brake 2. This happens when the expander piston 17 moves relatively towards the lower end of the bore 18, due to the force in the compression spring 19, to restrict the movement of the piston 17 and reduce the output from the pump 8. The pump 8 is disabled when the push-rod 27 is held at the extreme throw of the eccentric cam 24. Thereafter the control module 7 may act to de-energise the electric motor 12.

As the pressure applied to the brake 2 rises, second or subsequent skid signals may be received whereafter the sequence described above is repeated.

If, following correction of a skid, the pressure applied to the brake 2 becomes equal to the pressure at the master cylinder 1, the spool 6 is returned to its initial position to open the inlet valve and re-establish direct communication between the master cylinder, and the brake 2 through the groove 42. Normally this can occur only when:

(a) the driver releases the pedal of the master cylinder 1; or (b) the vehicle travels onto a surface having a coefficient of friction such that the pressure applied by the master cylinder 1 is insufficient to cause a skid, and the pressure applied to the brake 2 becomes equal to the pressure at the master cylinder 1.

This feature prevents a sudden increase in the pressure applied to the brake 2, which may cause a deep skid, when the vehicle passes from a low friction road surface to a higher friction road surface.

When the inlet pressure from the master cylinder 1 is released, the expander piston 18, urged by the spring 26, moves the push-rod 27 clear of the cam 24 and returns surplus fluid back to the inlet port 49 through the two valves 35 and 32.

Figure 3:
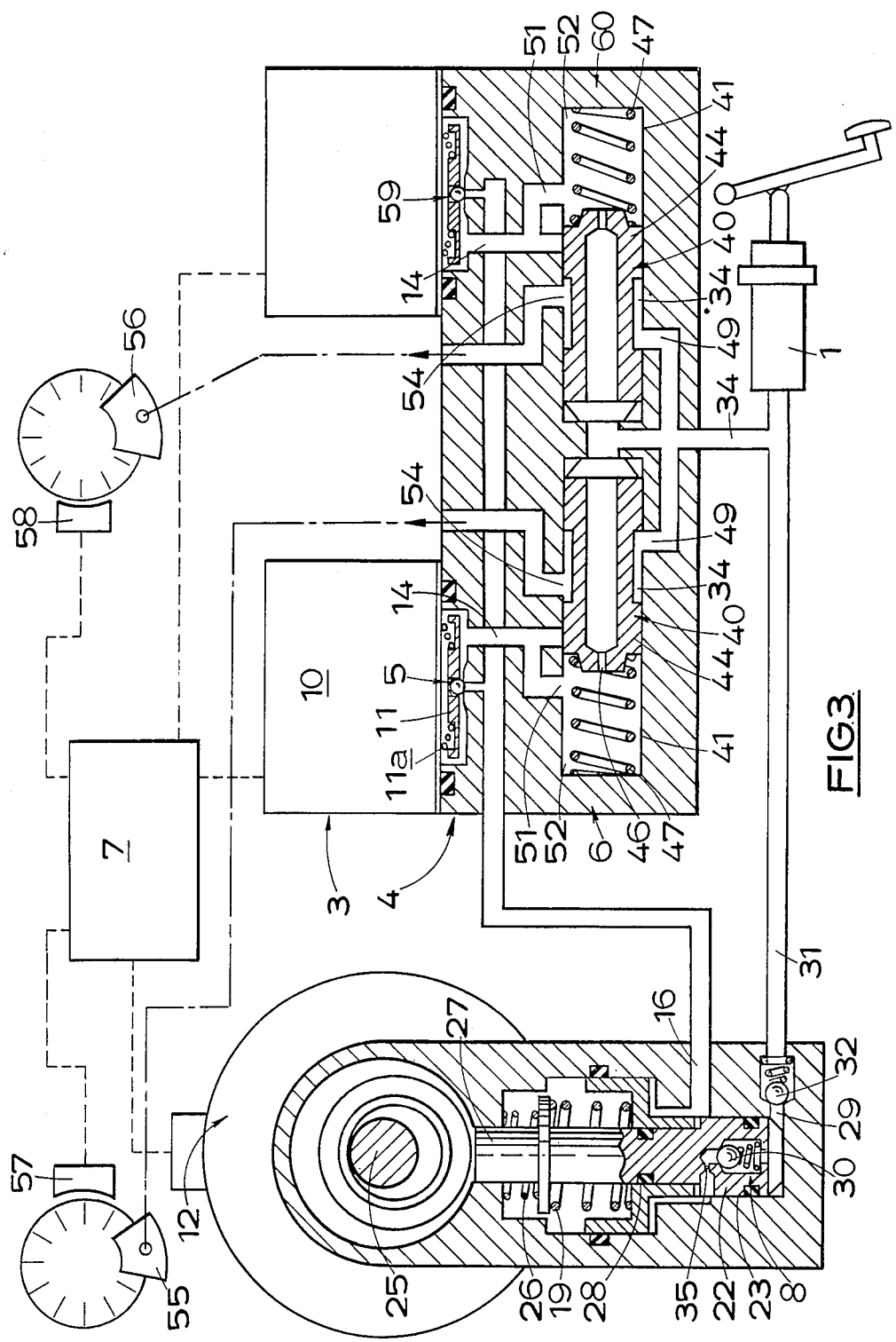
FIG. 3 is a layout of a braking system similar to FIGS. 1 and 2 but showing a modification.

The braking system shown in the layout of FIG. 3 is similar to that of FIGS. 1 and 2 but has been modified to control operation of more than one brake, for example a brake 55 on a front wheel of a vehicle, and a brake 56 on a rear wheel.

In this system the front wheel has a speed sensor 57, and the rear wheel has a speed sensor 58.

The modulator 3 is modified to incorporate a second solenoid-operated exahust valve 59 which is similar in construction to the solenoid-operated valve 5, and a second flow-control regulator valve 60 which is similar in construction to the regulator valve 6, is associated with the exhaust valve 59, and is arranged in tandem with the flow-control regulator valve 6. The valve 6 controls operation of the brake 55, and the valve 60 controls operation of the brake 56.

When the control module 7 receives a signal from one or each speed sensor 55, 57 it is operable to energise the electric motor 12, and the respective solenoid-operated exhaust valve 6, 60 in order to initiate the sequential release and controlled re-application of the respective brake 55, 56 as described above.

The construction and operation of the braking system of FIG. 3 is otherwise the same as that of FIGS. 1 and 2, and corresponding reference numerals have been applied to corresponding parts.

Figure 4:
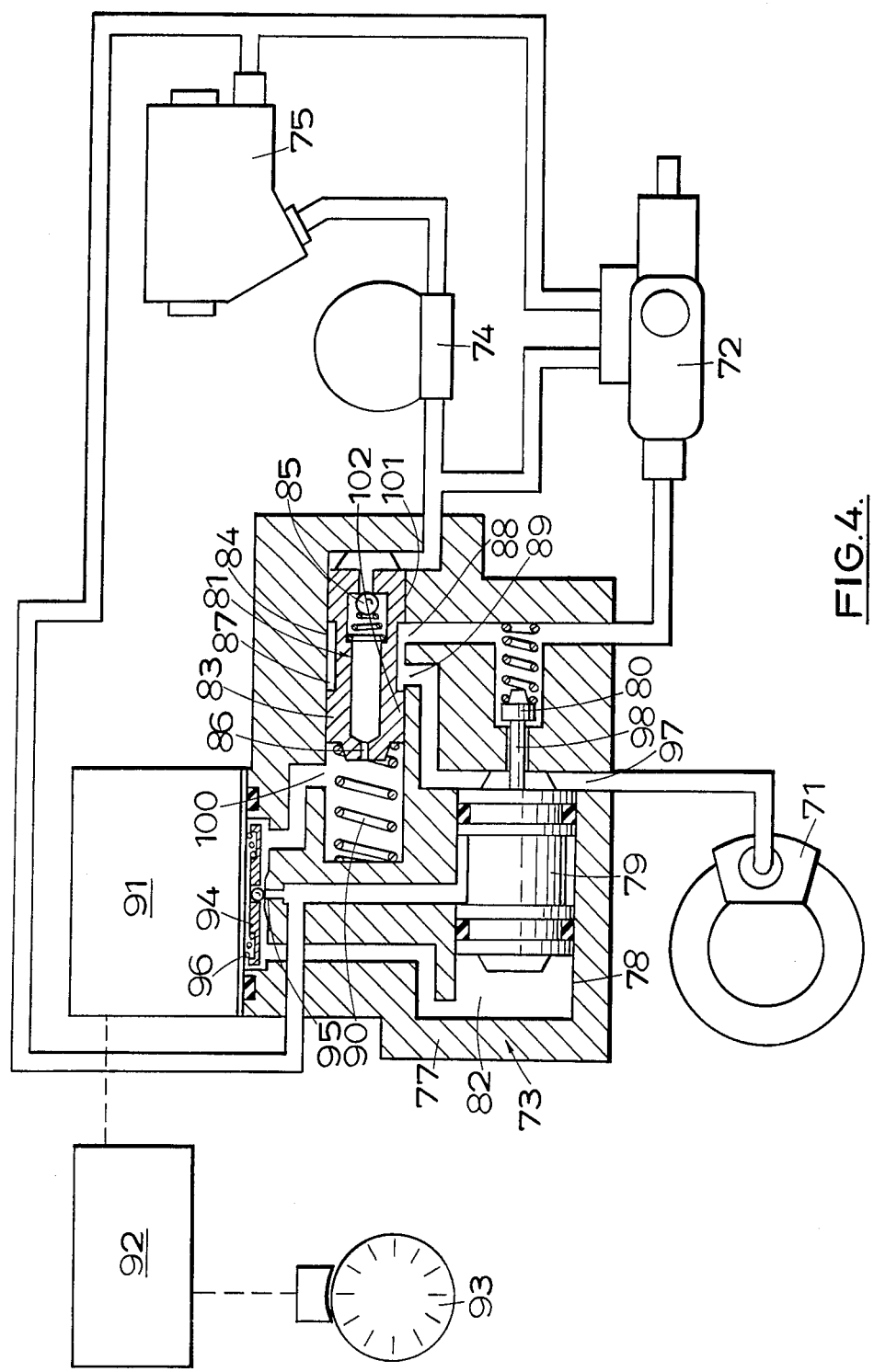
FIG. 4 is a layout of yet another braking system.

In the braking system shown in the layout of FIG. 4 a brake 72 is adapted to be applied by a master cylinder 72, and the supply from the master cylinder 72 to the brake is modulated by a modulator assembly 73. A fluid-sustained support force for the modulator assembly 73 is provided by an hydraulic accumulator 74 charged by a self-stalling pump 75, which may be driven by the prime mover of the vehicle or by a separate electric motor.

The modulator assembly 73 comprises a housing 77 provided with a bore 78 in which works a de-boost piston assembly 79, controlling operation of a small spring-loaded poppet valve 80 disposed between the master cylinder 72 and the brake 71.

A flow-control regulating valve 81 is arranged to control the supply of fluid from the hydraulic accumulator 74 to a fluid-sustaining chamber 82 at the outer end of the bore 78. The valve 81 comprises a spool 83 working in a bore 84 and provided with a one-way valve 85 and an orifice 86 in series with the one-way valve 85, to provide communication through the spool 83, and a radial groove 87 in the wall of the spool 83 provides free communication between axially spaced ports 88 and 89 between the master cylinder 72 and the brake 71 when the spool 83 is held in an inoperative position shown by a spring 90.

A solenoid-operated valve 91 responsive to signals from an electronic control module 92 which, in turn, monitors the behaviour of a wheel speed sensor 93, controls operation of an armature incorporating a valve member 94. The valve member 94 co-operates with a valve setting 95 to control the supply of fluid between the accumulator 74 and the reservoir for pump 75 through the flow control regulator valve 81.

In the inoperative position shown in FIG. 4 of the drawing no skid signal is present and the valve member 94 is biassed by a spring 96 into engagement with the seating 95 to isolate the accumulator 74 and the chamber 82 from the reservoir. Hydraulic fluid from the accumulator 74 acts on the outer end of the piston 79 through the flow-control regulator valve 81 to hold it in an advanced position in engagement with a stop defined by a face at the adjacent end of the bore 78 in which the effective volume of an expander chamber 97 defined between the port 89 and the brake 71 is at a minimum. The small valve 80 is held open by the piston 79 due to the action of a push-rod 98 so that the master cylinder 72 is in restricted communication with the brake 71.

The flow-control regulator valve 81 provides a free communication between the master cylinder 72 and the brake 71 through the groove 87 and the communicating ports 88 and 89. Lands 101, and 102 on opposite sides of the groove 87 are spaced from the ports 88 and 89, and from the exhaust port 100, respectively.

When a skid signal is produced by the skid sensor 93, the coil of the solenoid-operated valve 91 is energised to generate a force to overcome the load in the spring 96, in turn to cause the valve member 94 to move away from the seating 95. This connects the outer end of the bore 84 to the reservoir 76 and the consequent pressure drop across the fixed orifice 86 causes the spool 83 to move in the bore 84 against the force in the spring 90 to close the port 88. This closes the main communication between the master cylinder 72 and the brake 71. In addition the fluid-sustaining chamber 82 is also connected to the reservoir so that the piston 79 moves away from its original position, initially to permit the valve 80 to close, which completely isolates the master cylinder 72 from the brake 71. Further movement of the piston 79 in the same direction increases the effective volume of the expander chamber 97 to relieve the pressure applied to the brake 71. Finally the spool 83 moves into a rest position at which the land 102 hovers at the edge of the port 100, with the outer edge of the land constituting a variable orifice with the port 100.

The greater the period of time the solenoid-operated valve 91 is open to correct the skid, the greater the distance through which the piston 79 will move relatively away from the stop, until the brakes are fully relieved at maximum travel.

At the termination of the skid signal the coil of the solenoid valve 91 is de-energised and the spring 96 is operative to bias the member 94 into re-engagement with the seating 95. The flow-control regulator valve 81 remains in a metering mode with the spool 83 covering the port 88, but the pressure drop across the fixed orifice 86 causes the spool 83 to hover about the port 110 to permit a metered supply of fluid to pass to the chamber 82 through the port 110.

The pressure applied to the chamber 82 causes the piston 79 to move towards its advanced position, but at a rate controlled by the flow into the chamber 82 of fluid under the control of the flow control valve 81. This reduces the effective volume of the expansion chamber 97, in turn to re-apply the brake 71.

Assuming no further skid signal is received during the braking cycle, the piston 79 will be returned, at a controlled rate, towards its advanced position in which the volume of the expansion chamber 97 is at a minimum.

During the final stage of movement of the piston 79 into the advanced position, the valve 80 re-opens to allow restricted communication between the master cylinder 72 and the brake 71. This prevents a sudden increase in the pressure applied to the brake 71 caused by the pressure differential between the master cylinder 1 and the brake 71.

Of course, should a second skid signal be received during a common braking cycle, then the sequence described above will be repeated.

Should the pump 75 and/or the accumulator 74 fail at any time so that no re-application force can be generated in the support chamber 82, depending upon the position of the piston 79 in the bore portion 78 when such failure occurs, the piston 79 may be spaced away from its stop and will not, therefore, be able to hold the valve 80 open or to be movable in a direction to open the valve 80 following correction of a skid. This difficulty is overcome by the provision of the spring 90 which, under such circumstances, will move the spool 83 into a retracted position so that the ports 88 and 89 are in open communication.

When the spool 83 re-connects the brake 71 to the master cylinder 72, the pressure applied to the brake 71 will act upon the piston 79 to move it relatively away from the valve 80. However, since the fluid in the chamber 82 cannot flow back to the accumulator 74 through the one-way valve 85, the piston 79 is held in position.

I claim:

1. An hydraulic anti-skid braking system for a vehicle having a wheel, and comprising a brake for braking said wheel, a source of operating fluid for applying said brake, pressure-responsive means, sensing means for sensing the speed of rotation of said wheel and for emitting a signal when said speed or rotation exceeds a predetermined value, a modulator assembly for modulating the supply of operating fluid to said brake from said source in accordance with said signals from said sensing means, said modulator assembly incorporating means responsive to one of said signals to isolate said source from said brake and relieve the pressure of said operating fluid applied to said brake and, at the termination of said signal, to control re-application of said brake at a controlled rate, wherein said modulator assembly incorporates at least one flow-control regulator valve, and at least one exhaust valve, said flow-control regulator valve comprising a wall defining a bore, a metering spool which works in said bore and incorporates a fixed orifice, a spring biassing said spool, said spool being movable between a first position in which it is biassed by said spring to provide unrestricted direct communication of hydraulic fluid to said pressure-responsive means and a second position in opposition to the force in said spring and in which direct communication to said pressure-responsive means is cut-off and a variable orifice defined between said spool and said bore provides an indirect restricted communication of hydraulic fluid to said pressure-responsive means through said fixed orifice in said spool, a pressure drop across said fixed orifice determining the said second position, said exhaust valve being responsive to said signals and being movable between a closed position, when no signal is operative and said spool is biassed by said spring into the said first position, and an open position, when a signal is operative, to establish the said pressure drop whereby to cause said spool to move into the said second position.

2. A system according to claim 1, wherein said wall defining said bore is provided with an inlet port connected to an inlet passage, an exhaust port connected to an exhaust passage leading to said exhaust valve, and an outlet port, and said spool is provided with a radial groove, and with an inlet land and an exhaust land which are relatively spaced axially at opposite ends of said groove, said inlet land being adapted to co-operate with said inlet port, said exhaust land being adapted to co-operate with said exhaust port, and said outlet port being within said communication groove at all times, irrespective of the relative position of said spool in said bore, and a flow-path from said source is provided through said spool to control the rate of re-application of said brake.

3. A system according to claim 2, wherein said exhaust land is adapted to hover at an edge of said exhaust port to define said variable orifice.

4. A system according to claim 1, wherein said source comprises a motor driven pump.

5. A system according to claim 1, wherein said source comprises an hydraulic accumulator adapted to be charged by a motor driven pump.

6. A system according to claim 1, wherein said pressure-responsive means comprises said brake to which brake-applying fluid is supplied directly through said flow-control regulator valve.

7. A system according to claim 1, wherein said pressure-responsive means comprises a de-boost piston for controlling communication between the source and said brake and to which fluid from said source is supplied through said flow-control regulator valve.

8. An hydraulic anti-skid braking for a vehicle having wheels, and comprising a first brake for braking a first wheel, first pressure-responsive means, a second brake for braking a second different wheel, second pressure-responsive means, first sensing means for sensing the speed of rotation of said first wheel and for emitting a first signal when said speed of rotation exceeds a predetermined value, second sensing means for sensing the speed of rotation of said second wheel and for emitting a second signal when said speed of rotation exceeds a predetermined value, a source of operating fluid for applying said first and second brakes, a modulator assembly for modulating the supply of operating fluid to said first and second brakes from said source in accordance with signals from said first and second sensing means respectively, said modulator assembly incorporating first means responsive to said first signal to isolate said source from said first brake and relieve the pressure of said operating fluid applied to said first brake, and at the termination of said first skid signal, to control re-application of said brake at a controlled rate, and second means responsive to said second signal to isolate said source from said second brake and relieve the pressure of said operating fluid applied to said second brake and, at the termination of said second signal, to control re-application of said second brake at a controlled rate, wherein said modulator assembly incorporates first and second flow-control regulator valves arranged in tandem, and first and second exhaust valves, each associated with a respective one of said first and second flow control regulator valves, each first and second regulator valve and its associated first and second exhaust valve being adapted to control the behaviour of the respective first and second braked wheels in response to said first signal and said second signal respectively, wherein each said flow-control regulator valve comprises a wall defining a bore, a metering spool which works in said bore and incorporates a fixed orifice, a spring biassing said spool, said spool being movable between a first position in which it is biassed by said spring to provide unrestricted direct communication of hydraulic fluid to said pressure-responsive means and a second position in opposition to the force in said spring and in which direct communication to said pressure-responsive means is cut-off and a variable orifice defined between said spool and said bore provides an indirect restricted communication of hydraulic fluid to said pressure-responsive means through said fixed orifice in said spool, a pressure drop across said fixed orifice determining the said second position, said respective exhaust valve being responsive to said signals and being movable between a closed position, when no signal is operative and said spool is biassed by said spring into the said first position, and an open position, when a signal is operative, to establish the said pressure drop whereby to cause said spool to move into the said second position.

9. A system according to claim 8, wherein said wall defining said bore is provided with an inlet port connected to an inlet passage, an exhaust port connected to an exhaust passage leading to said exhaust valve, and an outlet port, and said spool is provided with a radial groove, and with an inlet land and an exhaust land which are relatively spaced axially at opposite ends of said groove, said inlet land being adapted to co-operate with said inlet port, said exhaust land being adapted to co-operate with said exhaust port, and said outlet port being in communication with said groove at all times, irrespective of the relative position of said spool in said bore, and a flow-path from said source is provided through said spool to control the rate of re-application of said brake.

10. A system according to claim 9, wherein said exhaust land is adapted to hover at an edge of said exhaust port to define said variable orifice.

11. A system according to claim 8, wherein said source comprises a motor driven pump.

12. A system according to claim 8, wherein said source comprises an hydraulic accumulator adapted to be charged by a motor driven pump.

13. A system according to claim 8, wherein said pressure-responsive means comprises said brake to which brake-applying fluid is supplied directly through said flow-control.

14. A system according to claim 8, wherein said pressure-responsive means comprises a de-boost piston for controlling communication between the source and said brake and to which fluid from said source is supplied through said flow-control regulator valve.

* * * * *